US012730177B2

(12) United States Patent
Mahlig et al.

(10) Patent No.: US 12,730,177 B2
(45) Date of Patent: Sep. 8, 2026

(54) METHOD FOR DETERMINING A CONFIDENCE VALUE FOR AN ESTIMATED PARAMETER IN A WIRELESS POSITIONING SYSTEM AND RADIO RECEIVER DEVICE

(71) Applicant: u-blox AG, Thalwil (CH)

(72) Inventors: Matthias Mahlig, Berlin (DE); Mohamad Abou Nasa, Malmo (SE); Peter Karlsson, Malmo (SE); Stelios Papaharalabos, Maroussi (GR); Yannis Arapakis, Maroussi (GR)

(73) Assignee: u-blox AG, Thalwil (CH)

( * ) Notice: Subject to any disclaimer, the term of this patent is extended or adjusted under 35 U.S.C. 154(b) by 118 days.

(21) Appl. No.: 18/537,428

(22) Filed: Dec. 12, 2023

(65) Prior Publication Data

US 2024/0192305 A1 Jun. 13, 2024

(30) Foreign Application Priority Data

Dec. 13, 2022 (EP) .................................... 22213159

(51) Int. Cl.
*G01S 5/02* (2010.01)

(52) U.S. Cl.
CPC .......... *G01S 5/0244* (2020.05); *G01S 5/0218* (2020.05)

(58) Field of Classification Search
CPC ........ G01S 5/0244; G01S 5/0218; G01S 5/04; G01S 5/0278
See application file for complete search history.

(56) References Cited

U.S. PATENT DOCUMENTS 8,170,830 B2 * 5/2012 Jacobs .................. G01S 5/0218 702/150
2002/0004697 A1 * 1/2002 Lai ........................... G08G 5/25 701/120

(Continued)

FOREIGN PATENT DOCUMENTS

WO WO-2024075099 A1 * 4/2024 ........... G01S 5/0244

OTHER PUBLICATIONS

Al-Sadoon et al., "A New Low Complexity Angle of Arrival Algorithm for 1D and 2D Direction Estimation in MIMO Smart Antenna Systems," Sensors, Nov. 15, 2017, 17(11):2631, 19 pages.

(Continued)

*Primary Examiner* — Cassi J Galt
(74) *Attorney, Agent, or Firm* — Fish & Richardson P.C.

(57) ABSTRACT

An example method for determining a confidence value for an estimated parameter in a wireless positioning system includes receiving a signal comprising a number of signal samples, pre-processing each sample of the number of signal samples and therefrom providing a number of pre-processed samples, and calculating a first confidence value. The method further includes performing a pre-estimation of a parameter and providing a pre-estimated parameter, calculating a second confidence value for the pre-estimated parameter, performing a final estimation of the parameter and providing the estimated parameter, and calculating a third confidence value for the estimated parameter. The method includes combining at least two of the first, second and third confidence value and providing the confidence value for the estimated parameter. The confidence value is configured to be used in determining a position of at least one mobile device based on the estimated parameter.

18 Claims, 5 Drawing Sheets

(56) References Cited

U.S. PATENT DOCUMENTS

| | | | | |
|---|---|---|---|---|
| 2009/0138151 | A1* | 5/2009 | Smid | G05D 1/0276<br>701/467 |
| 2017/0192083 | A1* | 7/2017 | Avitzour | G01S 5/02528 |
| 2023/0393267 | A1* | 12/2023 | Maley | G01S 13/931 |
| 2024/0085512 | A1* | 3/2024 | Guo | G01S 5/0218 |

OTHER PUBLICATIONS

Al-Sadoon et al., "The Selected Samples Effect on the Projection Matrix to Estimate the Direction of Arrival," In2019 UK/China Emerging Technologies (UCET), IEEE, Aug. 21, 2019, pp. 1-5.

Extended European Search Report in European Appln No. 22213159.1, mailed on May 26, 2023, 9 pages.

Ye et al., "A Method of Indoor Positioning by Signal Fitting and PDDA Algorithm using BLE AOA device," IEEE Sensors Journal, Jan. 11, 2022, 22(8):7877-7887.

* cited by examiner receive signal
S10
pre-process samples
S11
calculate CV1
S12
pre-estimate param.
S13
calculate CV2
S14
final estimation of parameter
S15
calculate CV3
S16
combine CVx
S17
provide CV
S18

20
21
Ant
Rcv
RF + BB
Sam 1
S1
Pre-processing
Sam 2
S2
raw estimation
P1
S3
Post-processing
P2
C4
CV
Calc 1
C1
CV1
Calc 2
C2
CV2
Calc 3
C3
CV3

METHOD FOR DETERMINING A CONFIDENCE VALUE FOR AN ESTIMATED PARAMETER IN A WIRELESS POSITIONING SYSTEM AND RADIO RECEIVER DEVICE

CROSS-REFERENCE TO RELATED APPLICATION(S)

This application claims priority to European Application No. 22213159.1, filed on Dec. 13, 2022, the contents of which are incorporated herein by reference in their entirety.

TECHNICAL FIELD

This disclosure relates to a method for determining a confidence value for an estimated parameter in a wireless positioning system. The disclosure is further directed to a radio receiver device, a computer program product and a computer readable storage medium.

BACKGROUND ART

In the transmission of radio frequency, RF, signals, on the receiver side RF signals are evaluated and relevant characteristics are estimated in order to properly detect the RF signals and decode data transmitted using these signals.

In this context, parameters of a wireless communication channel, which is used for the transmission of RF signals, are estimated. In the field of wireless positioning a position of a mobile device is determined based on an estimation of a direction parameter. In a short range wireless positioning system, for example, an angle-of-arrival, AoA, or an angle-of-departure, AoD, shall be estimated as the direction parameter. Said parameter is employed for calculating a position of a device and/or for navigating said device.

A performance of such AoA or AoD estimation is significantly affected by multipath signal propagation. Furthermore, it may also influence said estimation, whether such mobile device is in line-of-sight, LOS, with an anchor point. An AoA may be estimated in any case, however, it is questionable, whether each estimated value, even in multipath and non-LOS conditions, should be used in the determination of the position of the device in order to achieve a correct result, i.e. the determined position matches the true position of the device.

Consequently, an assessment regarding a quality of the estimated parameter, e.g. AoA, is necessary for determining its reliability. Basic mechanisms are known for determining the reliability or confidence of an estimated value such as AoA. It appears, however, that there is still room for improving the determining of a confidence value in order to achieve better results in the calculation of a device's position.

SUMMARY

One objective can therefore be seen in defining a method for determining a confidence value for an estimated parameter in a wireless positioning system, which provides improved results, especially in the case of multipath signal propagation.

The objective is achieved by the subject-matter of the independent claims. Embodiments and developments are defined in the dependent claims.

The definitions provided above also apply to the following description unless stated otherwise.

In one embodiment a method for determining a confidence value for an estimated parameter in a wireless positioning system, which comprises at least one anchor point and at least one mobile device, comprises the steps of

- receiving, by the at least one anchor point or by the at least one mobile device, a signal sent by at least one mobile device or sent by the at least one anchor point, the signal comprising a number of signal samples,
- pre-processing each sample of the number of signal samples and therefrom providing a number of pre-processed samples,
- calculating a first confidence value for the number of signal samples or for the number of pre-processed samples,
- performing a pre-estimation of a parameter using the number of pre-processed samples and therefrom providing a pre-estimated parameter,
- calculating a second confidence value for the pre-estimated parameter,
- performing a final estimation of the parameter using the pre-estimated parameter and therefrom providing the estimated parameter,
- calculating a third confidence value for the estimated parameter,
- combining at least two of the first confidence value, the second confidence value and the third confidence value and therefrom providing the confidence value for the estimated parameter, wherein the confidence value is configured to be used in determining a position of the at least one mobile device based on the estimated parameter.

The proposed method determines the confidence value for the estimated parameter using intermediate results, i.e. confidence values which are calculated for different stages performed during the method. In a first stage each sample of the number of signal samples is pre-processed. An output of this pre-processing first stage is the number of pre-processed samples. The first confidence value is calculated for the number of signal samples directly, i.e. from the received signal, or for the number of pre-processed samples generated during the pre-processing. In a second stage the parameter is pre-estimated on the basis of the pre-processed samples, which provides the pre-estimated parameter. Also, for this second stage, the second confidence value for this pre-estimated parameter is calculated. In a third stage the parameter is finally estimated from the pre-estimated parameter and the estimated parameter is provided accordingly. For the third stage the third confidence value for the estimated parameter is calculated as well. At least two of the first, the second and the third confidence value are combined to provide the confidence value for the estimated parameter.

Combining at least two of the confidence values calculated for the output of different stages of the processing of the received signal improves the determination of the confidence value for the estimated parameter. As the estimated parameter forms the basis for determining the position of the at least one mobile device, the confidence which is provided by the proposed method helps improve the quality of the position determination.

In an example, the estimated parameter comprises an angle of arrival. In that case, the at least one anchor point receives the signal sent by the at least one mobile device and subsequently determines the AoA according to the proposed method. In an alternative example, the estimated parameter comprises an angle of departure. In that case, the at least one mobile device receives the signal sent by the at least one anchor point and subsequently determines the AoD according to the proposed method. In each of these examples the position of the at least one mobile device is determined based on the respectively estimated parameter.

In a development combining at least two of the first confidence value, the second confidence value and the third confidence value comprises normalizing the at least two of the first, second and third confidence value used in the combining to a same output range to obtain at least two normalized confidence values and subsequently performing an operation which combines the at least two normalized confidence values. Therein said operation in particular comprises forming an average, or a sum or a weighted average or a weighted sum of the at least two normalized confidence values.

At least two of the three confidence values calculated for the three stages described above are combined to provide the confidence value for the estimated parameter. In an implementation example all three confidence values are combined for providing the final confidence value for the estimated parameter. In another exemplary implementation all three confidence values are used and one of these confidence values is weighted with the factor zero, such that in fact the other two confidence values contribute to the provision of the confidence value. In the case that all three confidence values are used in the combination, all three confidence values are normalized.

In a development calculating the first confidence value for the number of pre-processed samples or for the number of signal samples is effected using at least some samples of the number of signal samples or using at least some samples of the number of pre-processed samples, calculating a maximum and a variance of the used number of samples, and providing the first confidence value as a function of the maximum and the variance. In particular, the first confidence value is provided as a K-factor.

For calculating the first confidence value either part of the number of pre-processed samples or part of the number of signal samples is used. Therein the number of signal samples may differ from the number of pre-processed samples. For the number of samples that is used for calculating the first confidence value, the maximum and the variance are calculated. The first confidence value may also be provided in an exemplary implementation as the K-factor which defines a special relationship between the maximum and the variance, in the form of a ratio of a square of the maximum of the samples and the variance of the samples. Mapped onto the received signal which is processed in the proposed method, the K-factor is equal to the ratio of the square of the peak amplitude of the received signal and the variance in the amplitude, thereby indicating a degree of multipath in the received signal.

In a development performing the pre-estimation of the parameter using the number of pre-processed samples and therefrom providing the pre-estimated parameter is effected by performing a Propagator Direct Data Acquisition, PDDA, algorithm using the number of pre-processed samples as input, providing a PDDA pseudo-spectrum comprising a steering matrix, a propagator vector, and an augmented propagator vector, determining a maximum value within the PDDA pseudo-spectrum, determining an angular quantity corresponding to the maximum value and providing the angular quantity as the pre-estimated parameter. Calculating the second confidence value for the pre-estimated parameter comprises determining a column of a steering vector of the steering matrix, which has been calculated depending on the PDDA algorithm and corresponds best to the pre-estimated parameter, and providing the second confidence value as a function of a norm difference between the determined steering vector and the augmented propagator vector or as a function of a multiplication of the determined steering vector with the augmented propagator vector.

In the second stage of the processing of the received signal, the PPDA algorithm is employed to determine the pre-processed parameter. Therein, a 1D- or a 2D-PDDA may be employed, as known to those skilled in the art. The angular quantity determined by this PDDA algorithm may represent a pre-estimation of an angle of arrival of the signal sent by the at least one mobile device and received by the at least one anchor point. Each steering vector of the steering matrix reflects a theoretical phase difference occurring between different antenna elements of an antenna array used in the at least one anchor point. The propagator vector reflects the measured phase difference occurring between the different antenna elements of the antenna array of the at least one anchor point. The augmented propagator vector is the propagator vector normalized to the phase of the first antenna element. For calculating the second confidence value, the column of the steering vector is chosen which is closest to the angular quantity deduced as the pre-processed parameter by the PDDA algorithm. The second confidence value is determined either as a function of the norm difference between said steering vector and the augmented propagator vector used in the PDDA algorithm or, alternatively, the second confidence value is determined as a multiplication of the chosen steering vector and the augmented propagator vector.

The PDDA algorithm is run for determining the pre-estimation of the parameter. For the calculation of the second confidence value, some of the intermediate results of this PDDA algorithm, for example the steering vector and the augmented propagator vector, are used. Consequently, the quality of the final confidence value is increased without much additional computing effort.

In a development, performing the final estimation of the parameter using the pre-processed parameter and therefrom providing the estimated parameter comprises applying a post-processing to the pre-processed parameter based on a relationship between the pre-estimated parameter and a number of previously determined estimated parameters. Calculating the third confidence value for the estimated parameter comprises calculating a standard deviation of the estimated parameter in relation to the number of previously determined estimated parameters and providing the third confidence value depending on the standard deviation.

In the third stage the final estimation of the parameter is provided based on the pre-processed parameter. For this, a number of estimated parameters which has been previously determined using the proposed method is used. The currently determined pre-processed parameter is set in relation to the previously determined estimated parameters. For this, in an exemplary implementation a moving median buffer may be employed. The estimated parameter is devised accordingly. In another example, a weighted mean operation is applied. For providing the third confidence value the standard deviation of the estimated parameter is calculated in relation to the number of previously determined estimated parameters and the third confidence value is provided as a function thereof.

In a development the number of signal samples is determined by a reference period defined for the signal received from the at least one mobile device in the positioning system. Therein, the signal conforms to an industry standard and is received in the at least one anchor point by means of at least one antenna array. In particular, the reference period is a function of a Continuous Tone Extension, CTE, as defined in Bluetooth Low Energy, BLE, especially BLE 5.1 and/or later versions.

So in the case of BLE 5.1, the reference period may comprise part of CTE or full CTE. Therein, full CTE amounts to 160 microseconds representing about 150 signal samples. The reference period as defined and known to those skilled in the art comprises eight of these signal samples, after guard period samples removal. For calculation of the first confidence value, for example, either reference period signal samples received during the CTE are used, or part of the CTE is exploited for the pre-processed samples.

In the case of wireless LAN or UWB signals, preamble, header and/or payload data may be used for the reference period.

Each sample of the number of signal samples and each sample of the number of pre-processed samples comprises an in-phase and a quadrature value making up an I/Q sample in each case.

In a development the first confidence value represents a measure of a quality of the number of pre-processed samples or the number of signal samples as received. The second confidence value represents a measure of quality of the pre-estimated parameter. The third confidence value represents a measure of quality of the estimated parameter. The confidence value represents another measure of a quality of the estimated parameter.

Each of the first, the second, the third confidence value, as well as confidence value, which is finally provided by the method, represents a measure of quality of the parameter for which the respective confidence value has been calculated. The measure of quality reflects the reliability of the calculated parameter. By combining different confidence values devised during the proposed method, the quality of the final confidence value is greatly improved.

In a development, the estimated parameter comprises an angle of arrival or an angle of departure.

In one embodiment a radio receiver device comprises processing means for carrying out the method according to any of the embodiments and developments described above.

In a development the radio receiver device is implemented as an anchor point or as a mobile device, i.e. a tag, according to BLE, especially BLE 5.1 and/or later versions thereof. Also, the radio receiver device may be implemented in a device according to Wireless Local Area Network, WLAN, as defined by IEEE 802.11x, or according to ultra-wideband, UWB. Similarly, the radio receiver device may be implemented in a mobile device or a base station of a cellular communication system according to a standard defined by the Third Generation Partnership Program, 3GPP, especially 5G and/or later versions thereof.

According to an embodiment a computer program product for determining a confidence value for an estimated parameter in a wireless positioning system comprises instructions which, when executed on a computer, cause the computer to perform the method described in any of the embodiments and developments described above. The instructions may be stored in a preferably non-transitory, non-volatile computer readable storage medium.

A computer may have a processor and a storage medium comprising computer program instructions stored thereon enabling the processor to execute the method according to any of the embodiments and developments described above.

BRIEF DESCRIPTION OF THE DRAWINGS

The text below explains the proposed solution in detail using exemplary embodiments with reference to the drawings. Components and elements that are functionally identical or have an identical effect bear identical reference numbers. Insofar as parts or components correspond to one another in their function, a description of them will not be repeated in each of the following figures. Therein.

DETAILED DESCRIPTION

Figure 1:
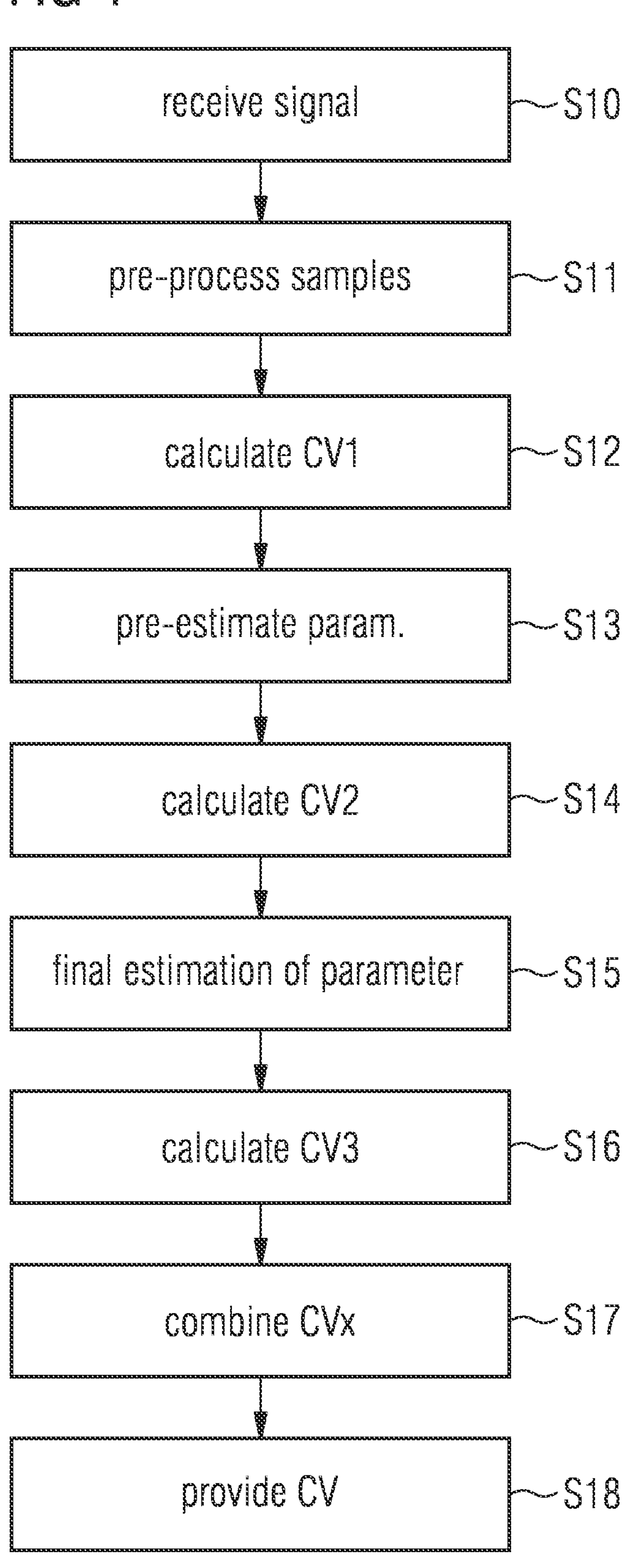
FIG. 1 shows an exemplary flowchart of a method as proposed.

FIG. 1 shows an exemplary flowchart of a method as proposed. The method comprises steps S10 to S18 as detailed in the following. The method serves for determining a confidence value for an estimated parameter in a wireless positioning system, which comprises at least one anchor point and at least one mobile device. The confidence value is configured to be used in determining a position of the at least one mobile device based on the estimated parameter.

In step S10 the at least one anchor point receives a signal sent by the at least one mobile device. The signal comprises a number of signal samples.

For example, according to established practice the anchor point represents a radio receiver device for RF signals. The wireless positioning system may be a short range wireless positioning system, which is based on the Bluetooth Low Energy, BLE, standard, for example on BLE 5.1. This positioning system allows to determine the position of a mobile device, for example of the at least one mobile device, in indoor locations. As known to those skilled in the art, the anchor point employs at least one antenna array, each array having various, for example three, antenna elements. The signal which is sent by the at least one mobile device is received by the elements of the antenna array concurrently, but with a slight phase shift relative to each other. In a so-called far field approach these phase shifts or differences observed with the antenna array of the anchor point are used in the calculation of an angle of arrival of the received signal. Said angle of arrival is one example of the estimated parameter for which the proposed method determines the confidence value. The at least one mobile device can be implemented as a tag, for example according to the BLE standard. The signal that is transmitted from the at least one mobile device and received by the at least one anchor point in step S10 may be a Bluetooth direction finding signal, which comprises a constant tone extension, CTE, packet. Alternatively, other RF signals, like Wi-Fi signals or cellular signals could be used as well.

The received signal comprises a number of signal samples. Such signal samples may be represented as I/Q samples.

In step S11 the received signal samples undergo a pre-processing. As known to those skilled in the art such pre-processing comprises, but is not limited to, compensation of a frequency offset and reordering of signal samples based on the antenna elements pattern. The pre-processing step S11 turns the number of received signal samples into a number of pre-processed samples.

In step S12, a first confidence value is calculated for the number of signal samples or for the number of pre-processed samples. This means that either at least part of the number of signal samples as received or at least part of the number of pre-processed samples is used as input for calculating the first confidence value. In this calculation a maximum and a variance of the number of samples used as input is calculated. The first confidence value is then provided as a function of this calculated maximum and variance.

In an exemplary implementation the first confidence value is provided as a K-factor based on the calculated maximum and variance according to the following equation:

$$K_{factor} = \frac{\max\left[\text{abs(IQ\_samples)}^2\right]}{\text{var[abs(IQ\_samples)]}}$$

The K-factor consequently takes account of the spatial component of the received signals due to the different antenna elements of the antenna array and the time which is derived from the length of the CTE packet.

In step S13, a pre-estimation of the parameter is performed using the number of pre-processed samples. This provides a pre-estimated parameter.

In the example of the BLE positioning system mentioned above, a pre-estimation of an angle-of-arrival is provided in this step S13.

In the implementation of step S13, the PDDA algorithm may be used, for example a 1D PDDA algorithm. The PDDA algorithm is basically known to those skilled in the art and is just roughly described in the following. A full description may be found in document by M. A. G. Al-Sadoon, "A New Low Complexity Angle of Arrival Algorithm for 1D and 2D Direction Estimation in MIMO Smart Antenna Systems", Sensors, 2017, 17, 2631; doi:10.3390/s17112631.

The PDDA algorithm uses the number of pre-processed samples as input. In a first step an input matrix, so-called r-matrix, is constructed for the antenna array. The r-matrix basically comprises the samples of the number of pre-processed samples detected by a number of M antenna elements of the anchor point's antenna array from the received signal at time instants t1, t2, . . . , tN. Therein, the samples of each antenna element are arranged in a row in consecutive time instants.

$$r = \begin{bmatrix} r_0(t_1) & r_0(t_2) & \cdots & r_0(t_N) \\ r_0(t_1) & r_1(t_2) & \cdots & r_1(t_N) \\ \vdots & \vdots & \cdots & \vdots \\ r_{M-1}(t_1) & r_{M-1}(t_2) & \cdots & r_{M-1}(t_N) \end{bmatrix}$$

Next, a steering vector a(φ) for 1D-PDDA using only the azimuth angle φ or a(φ,θ) for 2D-PDDA using the azimuth angle φ and the elevation angle θ is computed. The steering vector reflects the theoretical phase difference between the different antenna elements of the antenna array used in the at least one anchor point. Each antenna element is accorded a steering vector. The following description further explains the processing according to the 1D-PDDA algorithm, as an example.

A combination of several steering vectors constructs a steering matrix A:

$$A = [\alpha_1 \;\; \alpha_2 \;\; \ldots \;\; \alpha_i \;\; \ldots \;\; \alpha_n]$$

The r-matrix is divided into two sub-matrices h and H as follows:

$$h_{1\times N} = [\, r_0(t_1) \;\; r_0(t_2) \;\; \cdots \;\; r_0(t_N) \,]$$

$$\mathcal{H}_{(M-1)\times N} = \begin{bmatrix} r_1(t_1) & r_1(t_2) & \cdots & r_1(t_N) \\ \vdots & \vdots & \cdots & \vdots \\ r_{M-1}(t_1) & r_{M-1}(t_2) & \cdots & r_{M-1}(t_N) \end{bmatrix}$$

Here, h represents the first row of the r-matrix and $\mathcal{H}$ represents the remaining part.

Then, a propagator vector p is computed:

$$p = \frac{1}{h \cdot h^H} h \cdot \mathcal{H}^H$$

The propagator vector p represents the cross-correlation between the first row, i.e. received signal data from the first antenna element, and the other rows of the r-matrix. This has the effect of normalizing to the phase of the first antenna element and removing the dependency on the signal time series.

From the propagator vector an augmented propagator vector e is constructed according to the following by adding a unit element:

$$e = [1 p]^T$$

Next, a PDDA pseudo-spectrum P is computed as:

$$P = \left|A^T \cdot e\right|^2$$

The pseudo-spectrum represents the spatial power spectrum.

An angular quantity ϕ representing a pre-estimation of the AoA is determined by searching for the maximum peak in the PDDA pseudo-spectrum. ϕ is given by $$\hat{\phi} = \underset{-90<\varphi<90}{\text{argmax}} \; P(\varphi)$$

$\hat{\varphi}$ represents the pre-estimated parameter.

Subsequently in step S14 the second confidence value is calculated for the pre-estimated parameter. The second confidence value is a measure of quality for the pre-estimated parameter, in other words it is an indication of the quality or reliability of the pre-estimation performed in step S13. For this, a column of a steering vector of the steering matrix A is determined, which corresponds best to the pre-estimated parameter. The steering matrix, which has already been used in the PDDA algorithm in step S13, is reused here and the column of the steering vector is chosen which is closest to the estimated angular quantity $\hat{\varphi}$ determined in step S13. For this, for example, an angular search is performed in the steering matrix with very low resolution, e.g. one degree, in order to find the corresponding steering vector. The steering vector a, which is closest to the estimated angle $\hat{\varphi}$ is defined as:

$$e_{\hat{\varphi}} = a(\hat{\varphi})$$

The second confidence value is calculated based on the determined steering vector and the augmented propagator vector. In a first alternative the second confidence value is provided as a function of a norm difference between the determined steering vector and the augmented propagator vector as follows:

$$CV_{\hat{\varphi}} = -\log_2\left[\left(\frac{\|e_{\hat{\varphi}} - e^*\|}{\|e_{\hat{\varphi}}\|^2}\right)^2\right]$$

In a second alternative the second confidence value is provided as a function of a multiplication of the determined steering vector and the augmented propagator vector according to the following equation:

$$CV_{\hat{\varphi}} = -\log_2\left[\left|\frac{e_{\hat{\varphi}}^T e - e_{\hat{\varphi}}^H e_{\hat{\varphi}}}{|e_{\hat{\varphi}}^H e_{\hat{\varphi}}|^2}\right|^2\right]$$

In step S15 a final estimation of the parameter is performed by using the pre-estimated parameter as input. For this, the pre-estimated parameter undergoes post-processing in which a relationship between the pre-estimated parameter and a number of previously determined estimated parameters is analyzed.

In this post-processing a moving median buffer may be employed, for example, to analyse the just pre-estimated parameter in the context of a certain number of estimated parameters determined by previous runs of the method and stored in some kind of memory. By means of the moving median buffer, a so-called moving average or mean from the previously determined estimated parameters and the pre-estimated parameter calculated in step S13 of the current run of the method is determined. A weighting function may also be applied to this moving average.

In step S16 a third confidence value is calculated by determining a standard deviation of the estimated parameter in relation to the number of previously determined estimated parameters. The third confidence value is provided depending on this standard deviation. High standard deviation may lead to a low confidence value, whereas a low standard deviation may lead to a high confidence value.

In step S17 at least two of the first, the second and the third confidence values are combined. From this combination the confidence value is provided for the estimated parameter as output of the method. In this combining step S17, at least two out of the three confidence values calculated in steps S12, S14 and S16 are used. Of course, all three confidence values may be used in this combining step S17. In the combining first of all the confidence values used are normalized to a same output range, which results in at least two normalized confidence values. In a subsequent operation the at least two normalized confidence values are combined. This may be effected by forming an average, or a sum, or a weighted average or a weighted sum of the at least two normalized confidence values.

In step S18 the confidence value resulting from the combining step S17 is provided.

The confidence value which is provided by the proposed method offers a more distinctive assessment of the estimation which delivers the estimated parameter. For determining the position of the at least one mobile device, an AoA estimation of at least three anchor points is needed, as known to those skilled in the art. Due to the highly distinctive quality information provided by the proposed method for the estimated parameter, a downstream connected computing device which determines the position of the mobile device is enabled to treat the estimated parameter according to its confidence value, for example to exclude an estimated parameter with low confidence value from the calculation of a position. Thereby, the whole process of determining the position of the mobile device is enhanced.

Figure 2:
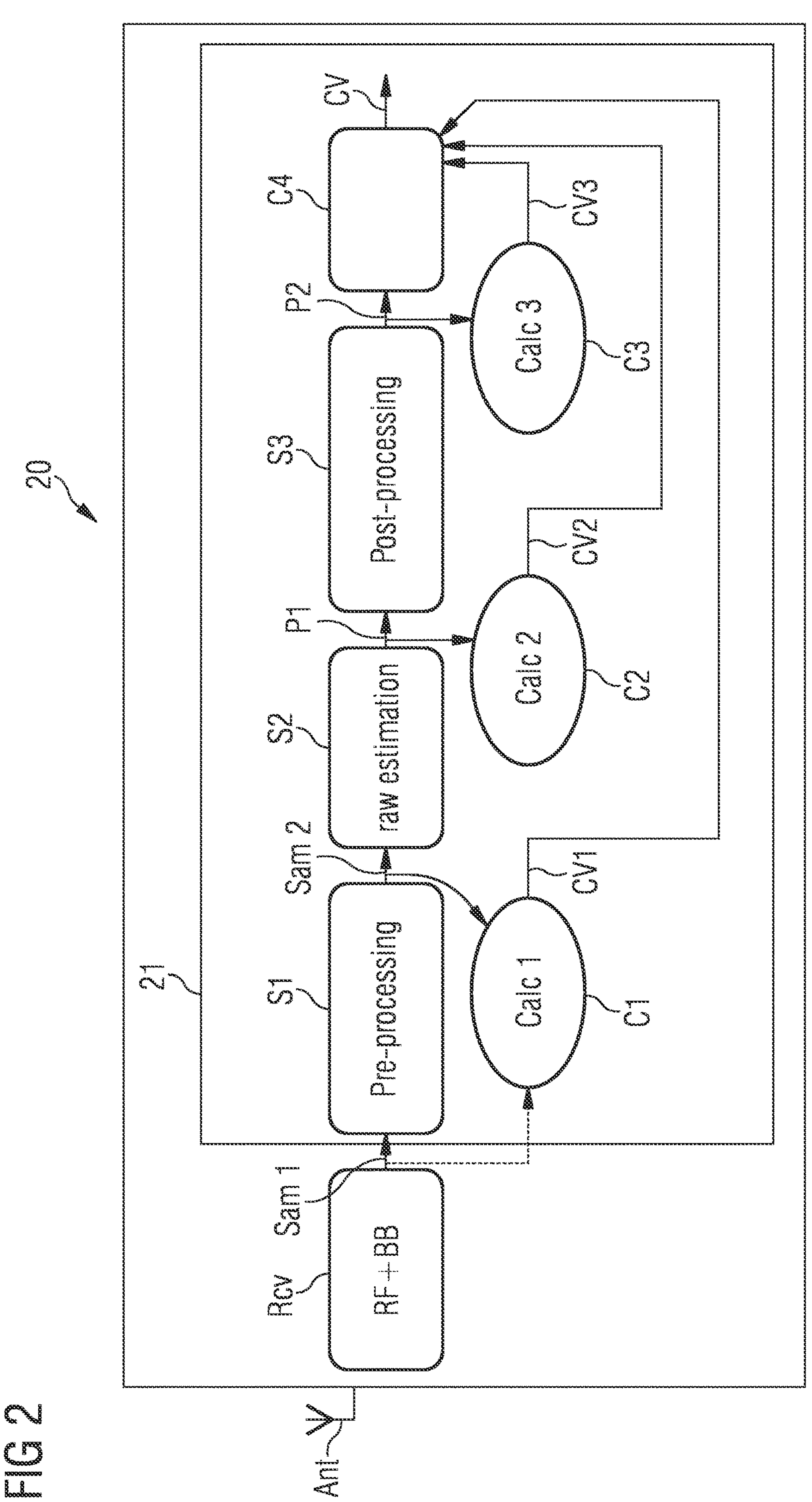
FIG. 2 shows an exemplary diagram of a radio receiver device as proposed.

FIG. 2 shows an exemplary diagram of a radio receiver device as proposed. The radio receiver device 20 comprises processing means 21 prepared to execute the method as described in FIG. 1, for example. The processing means 21 are implemented, for example, by means of a microprocessor and suitable storage means not explicitly shown in FIG. 2, but known to the skilled reader. Exemplary functional blocks of the processing means 21 are depicted. Accordingly, the processing means 21 comprise a first stage S1, a second stage S2 and a third stage S3. The processing means 21 further comprise a first value calculation unit C1, a second value calculation unit C2, a third value calculation unit C3 and a combining unit C4.

The radio receiver device 20 further comprises an antenna Ant and a receiver unit Rcv. The antenna Ant is prepared to at least receive RF signals as known to those skilled in the art. The receiver unit Rcv is configured to process RF signals received via the antenna Ant and at least apply sampling and down conversion of the received signals to baseband as known to the skilled reader. The receiver unit Rcv consequently provides the number of signal samples Sam1 to the processing means 21.

The antenna Ant is implemented in accordance with the application in which the radio receiver device 20 is used. In case the radio receiver device 20 is implemented in an anchor point e.g. according to BLE 5.1 and shall provide an AoA estimation as the estimated parameter, the antenna Ant comprises at least one antenna array having three or more antenna elements. In case the radio receiver device 20 is implemented in a mobile device e.g. according to BLE 5.1, i.e. a tag, and shall provide an AoD estimation as the estimated parameter, the antenna Ant comprises one antenna element. In that case the receiver unit Rcv is configured to receive an RF signal sent from a sending device, e.g. an anchor point, the signal being sent with at least one antenna array sequentially using antenna elements of said antenna array in a timed sequence. The receiver unit Rcv is further prepared to generate signal samples for each antenna element of the at least one antenna array by sampling the received signal at a plurality of time instants associated with the timed sequence used in the sending device.

In analogy to the method described in FIG. 1, in the processing means 21, the first stage S1 receives the number of signal samples Sam1 and performs the pre-processing as of step S11. Accordingly, the number of pre-processed samples Sam2 is provided.

The first value calculation unit C1 calculates the first confidence value CV1 either for at least part of the number of signal samples Sam1 or for at least part of the number of pre-processed samples Sam2 as described in step S12.

The second stage S2 performs the pre-estimation of the parameter from the number of pre-processed samples Sam2 and consequently provides the pre-estimated parameter P1 as described in step S13.

The second value calculation unit C2 calculates the second confidence value CV2 for the pre-estimated parameter P1, using said pre-estimated parameter P1 as input as described above with reference to step S14.

The third stage S3 performs the final estimation of the parameter using the pre-estimated parameter P1 and therefrom provides the estimated parameter P2 as detailed in step S15 above.

The third value calculation unit C3 also uses the estimated parameter P2 as input and calculates the third confidence value CV3 as detailed in step S16.

The combining unit C4 combines at least two of the first confidence value CV1, the second confidence value CV2 and the third confidence value CV3 and therefrom provides the confidence value CV for the estimated parameter as described in steps S17 and S18.

As the enhanced confidence value CV provided by the radio receiver device 20 is used in determining the position of the at least one mobile device which sends the number of signal samples Sam1, the precision of the positioning is greatly improved.

The radio receiver device 20 as shown may be used in an anchor point, in a BLE 5.1 short range wireless positioning system, for example in an indoor positioning scenario, for providing an AoA estimation and the corresponding confidence value, for example.

Figure 3:
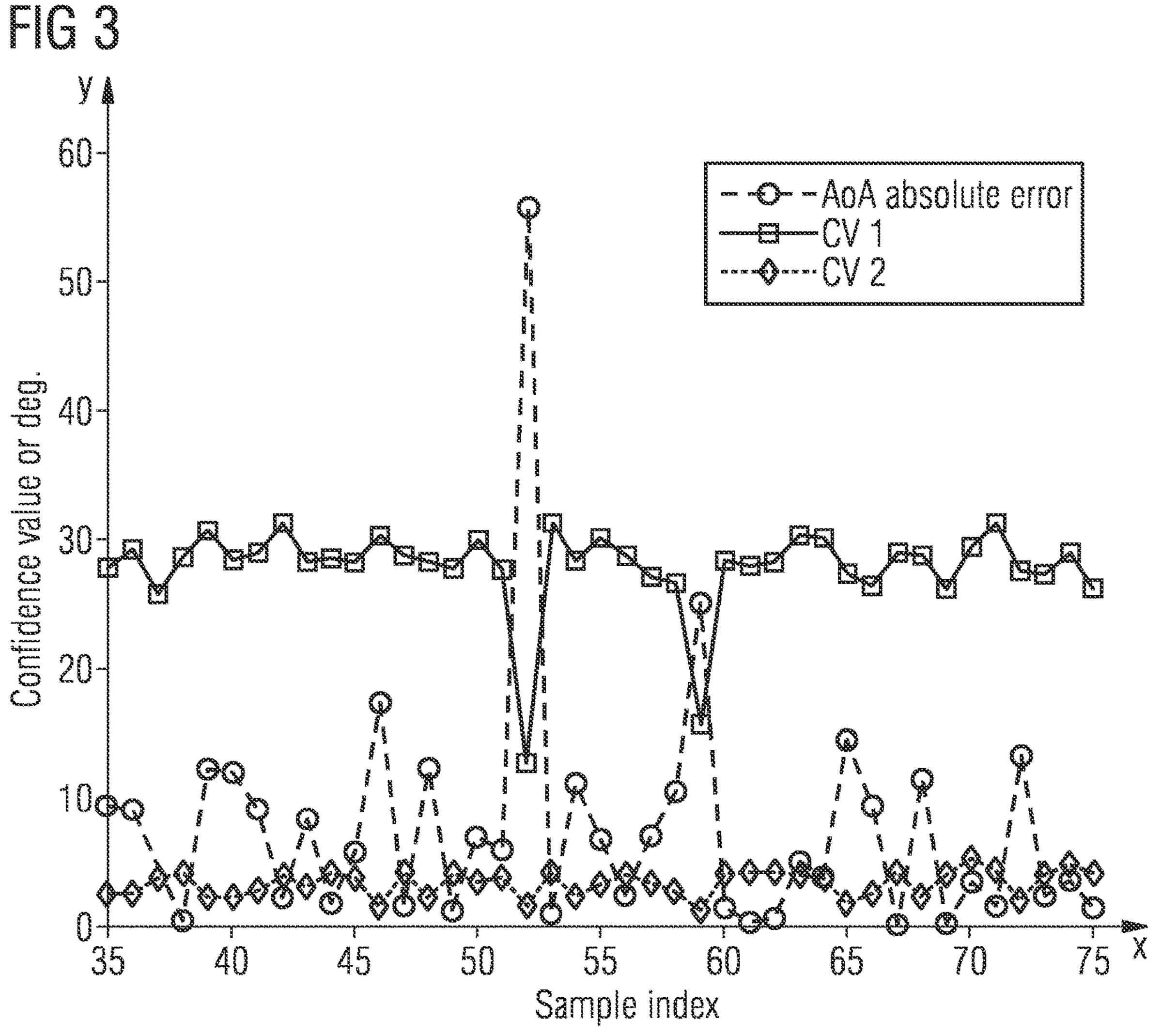
FIG. 3 shows exemplary measurement results of the method as proposed.

FIG. 3 shows exemplary measurement results of the method as proposed. On the x-axis the sample index in time is depicted, while on the y-axis the confidence value CV determined by the method is shown. The dashed line shows the AoA absolute error in degree assuming that the true position is known. The upper full line shows the first confidence value CV1, while the lower dotted line shows the second confidence value CV2. In the measurement scenario a tag device has been used in a multipath and non-line-of-sight setup.

Overall it can be determined that the second confidence value CV2 achieves a result with higher quality compared with the first confidence value CV1.

For instance, at sample indexes 52 or 59 in which very high absolute AoA errors appear, the corresponding CV1 and CV2 values are very small, hence low reliabilities in AoA estimation are expected. Also, at sample index 46 in which high absolute AoA error appears, the corresponding CV2 value is very small in this case.

Figure 4:
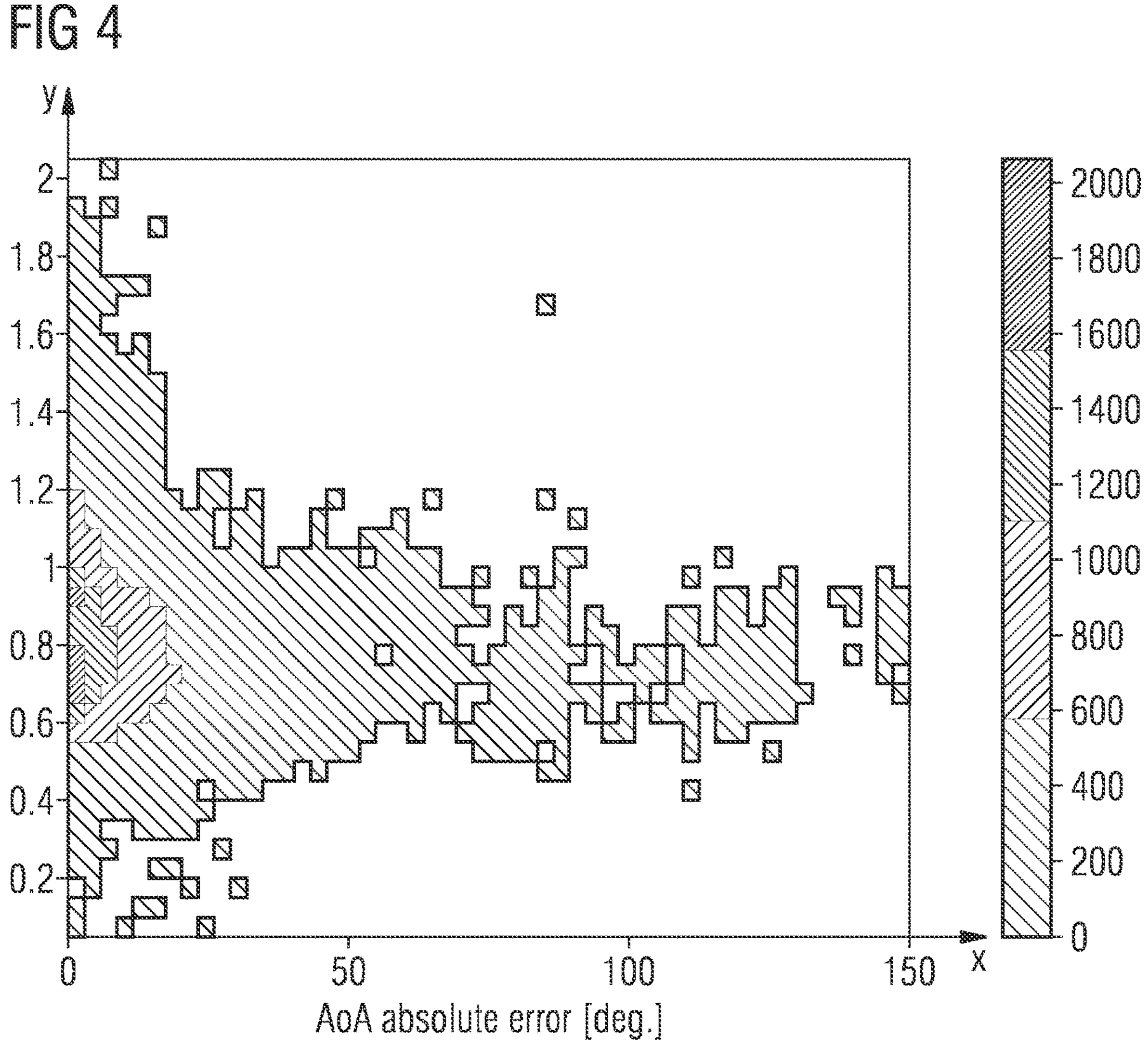
FIG. 4 shows further exemplary measurement results of the method as proposed.

FIG. 4 shows further exemplary measurement results of the method as proposed. These results are presented in the form of a histogram showing a distribution of the confidence value CV on the y-axis versus the absolute AoA error assuming that the true position is known in degree on the x-axis. The frequency of the calculated confidence value CV is shown coded in different hatching. Said coding is indicated by the scale on the right side of the histogram. The confidence value CV in this FIG. 4 is the combination of the first and the second confidence values as described above.

It can be discerned that only rarely a high confidence value is devised for a high absolute AoA error. However, for low AoA absolute errors very often an adequate confidence value of 1 or below is calculated.

Figure 5:
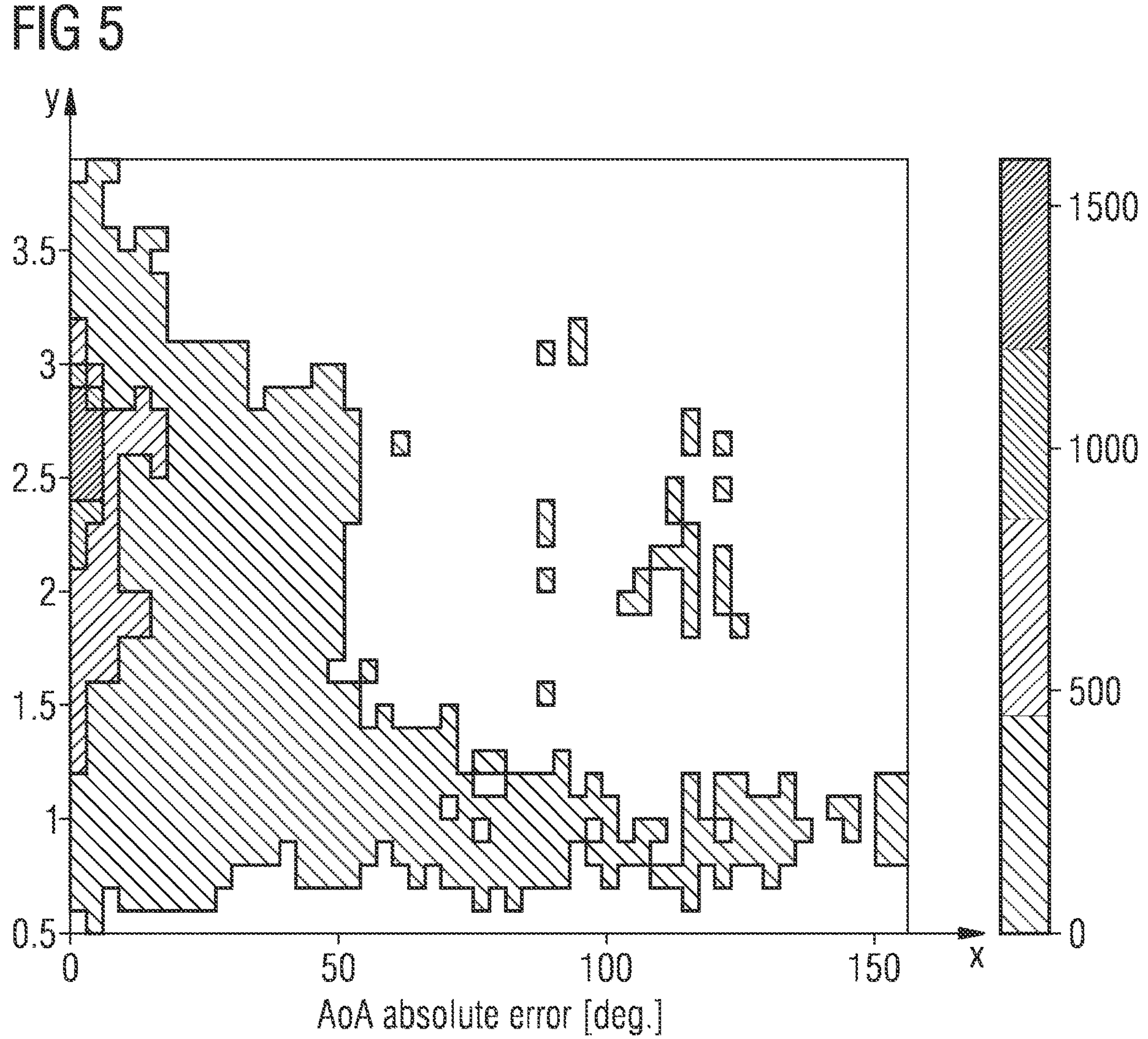
FIG. 5 shows more exemplary measurement results of the method as proposed.

FIG. 5 shows more exemplary measurement results of the method as proposed. Similar to FIG. 4, the results are depicted in the form of a histogram. In contrast to FIG. 4, however, on the y-axis the confidence value CV is depicted which in this FIG. 5 is a combination of the first, the second and the third confidence values calculated in the method as proposed.

It can be determined that for a small absolute AoA error a high confidence value is calculated in most of the cases.

It will be appreciated that the invention is not limited to the disclosed embodiments and to what has been particularly shown and described hereinabove. Rather, features recited in separate dependent claims or in the description may advantageously be combined. Furthermore, the scope of the invention includes those variations and modifications which will be apparent to those skilled in the art and fall within the scope of the appended claims. The term "comprising" used in the claims or in the description does not exclude other elements or steps of a corresponding feature or procedure. In the case that the terms "a" or "an" are used in conjunction with features, they do not exclude a plurality of such features. Moreover, any reference signs in the claims should not be construed as limiting the scope.

REFERENCE SIGNS

S1, S2, S3 stage
C1, C2, C3 value calculation unit
C4 combiner unit
S10, S11, S12, S13, S14, S15, S16, S17, S18 step
20 receiver device
21 processing means
Ant antenna
Rcv receiver unit
Sam1, Sam2 number of samples
P1, P2 parameter
C1, C2, C3, C4 unit
CV1, CV2, CV3, CV confidence value

The invention claimed is:

1. A method for determining a confidence value for an estimated parameter in a wireless positioning system, which comprises at least one anchor point and at least one mobile device, the method in a wireless positioning system comprising:

receiving, by the at least one anchor point or by the at least one mobile device, a signal sent by the at least one mobile device or by the at least one anchor point, the signal comprising a number of signal samples;

pre-processing each sample of the number of signal samples and therefrom providing a number of pre-processed samples;

calculating a first confidence value for the number of signal samples or for the number of pre-processed samples;

performing a pre-estimation of a parameter using the number of pre-processed samples and therefrom providing a pre-estimated parameter;

calculating a second confidence value for the pre-estimated parameter;

performing a final estimation of the parameter using the pre-estimated parameter and therefrom providing the estimated parameter;

calculating a third confidence value for the estimated parameter; and combining at least two of the first confidence value, the second confidence value and the third confidence value and therefrom providing the confidence value for the estimated parameter, wherein the confidence value is configured to be used in determining a position of the at least one mobile device based on the estimated parameter.

2. The method according to claim 1, wherein combining at least two of the first confidence value, the second confidence value and the third confidence value comprises:

normalizing the at least two of the first confidence value, the second confidence value and the third confidence value used in the combining to a same output range to obtain at least two normalized confidence values; and subsequently performing an operation which combines the at least two normalized confidence values, wherein said operation in particular comprises forming an average or a sum or a weighted average or a weighted sum of the at least two normalized confidence values.

3. The method according to claim 1, wherein calculating the first confidence value for the number of signal samples or for the number of pre-processed samples is effected by:

using at least some samples of the number of signal samples or using at least some samples of the number of pre-processed samples, calculating a maximum and a variance of the used number of samples, and providing the first confidence value as a function of the maximum and the variance.

4. The method according to claim 1, wherein performing the pre-estimation of the parameter using the number of pre-processed samples and therefrom providing the pre-estimated parameter is effected by:

performing a Propagator Direct Data Acquisition (PDDA) algorithm using the number of pre-processed samples as input, providing a PDDA pseudo-spectrum comprising a steering matrix, a propagator vector, and an augmented propagator vector, determining a maximum value within the PDDA pseudo-spectrum, determining an angular quantity corresponding to the maximum value, and providing the angular quantity as the pre-estimated parameter, and wherein calculating the second confidence value for the pre-estimated parameter comprises:

determining a column of a steering vector of the steering matrix, which has been calculated depending on the PDDA algorithm and corresponds best to the pre-estimated parameter, and providing the second confidence value as a function of a norm difference between the determined steering vector and the augmented propagator vector or as a function of a multiplication of the determined steering vector and the augmented propagator vector.

5. The method according to claim 1, wherein performing the final estimation of the parameter using the pre-estimated parameter and therefrom providing the estimated parameter comprises applying a post-processing to the pre-estimated parameter based on a relationship between the pre-estimated parameter and a number of previously determined estimated parameters, and wherein calculating the third confidence value for the estimated parameter comprises calculating a standard deviation of the estimated parameter in relation to the number of previously determined estimated parameters and providing the third confidence value depending on the standard deviation.

6. The method according to claim 1, wherein the number of signal samples is determined by a reference period defined for the signal received from the at least one mobile device in the positioning system, wherein the signal conforms to an industry standard and is received in the at least one anchor point by means of at least one antenna array, wherein the reference period is a function of a Continuous Tone Extension (CTE) as defined in Bluetooth Low Energy (BLE).

7. The method according to claim 1, wherein the first confidence value represents a measure of a quality of the number of pre-processed samples or number of signal samples, the second confidence value represents a measure of a quality of the pre-estimated parameter, and the third confidence value represents a measure of a quality of the estimated parameter, and wherein the confidence value represents another measure of a quality of the estimated parameter.

8. The method according to claim 1, wherein the estimated parameter comprises an angle-of-arrival or an angle-of-departure.

9. A radio receiver device implemented as an anchor point or as a mobile device in a wireless positioning system, the radio receiver device comprising:

at least one processor; and at least one storage medium coupled to the at least one processor and storing machine-readable instructions that, when executed by the at least one processor, cause the at least one processor to perform operations comprising:

receiving a signal comprising a number of signal samples;

in response to receiving the signal comprising the number of signal samples, pre-processing each sample of the number of signal samples and therefrom providing a number of pre-processed samples;

calculating a first confidence value for the number of signal samples or for the number of pre-processed samples;

performing a pre-estimation of a parameter using the number of pre-processed samples and therefrom providing a pre-estimated parameter;

calculating a second confidence value for the pre-estimated parameter;

performing a final estimation of the parameter using the pre-estimated parameter and therefrom providing the estimated parameter;

calculating a third confidence value for the estimated parameter; and combining at least two of the first confidence value, the second confidence value and the third confidence value and therefrom providing a confidence value for the estimated parameter;

wherein the confidence value for the estimated parameter is configured to be used in determining a position of the mobile device based on the estimated parameter.

10. The radio receiver device according to claim 9, wherein at least one of the following applies:

the radio receiver device is implemented in the anchor point according to Bluetooth Low Energy, or the radio receiver device is implemented in the mobile device, according to BLE, or the radio receiver device is implemented in the mobile device or a base station of a cellular communication system according to a standard defined by the Third Generation Partnership Program (3GPP), or the radio receiver device is implemented in the anchor point or the mobile device according to Wireless Local Area Network (WLAN), as defined by IEEE 802.11x, or according to ultra-wideband (UWB).

11. The radio receiver device according to claim 9, wherein the operation of combining at least two of the first confidence value, the second confidence value and the third confidence value comprises:

normalizing the at least two of the first confidence value, the second confidence value and the third confidence value-used in the combining to a same output range to obtain at least two normalized confidence values; and subsequently performing an operation which combines the at least two normalized confidence values, wherein said operation in particular comprises forming an average or a sum or a weighted average or a weighted sum of the at least two normalized confidence values.

12. The radio receiver device according to claim 9, wherein the operation of calculating the first confidence value for the number of signal samples or for the number of pre-processed samples is effected by:

using at least some samples of the number of signal samples or using at least some samples of the number of pre-processed samples, calculating a maximum and a variance of the used number of samples, and providing the first confidence value as a function of the maximum and the variance.

13. The radio receiver device according to claim 9, wherein the operation of performing the pre-estimation of the parameter using the number of pre-processed samples and therefrom providing the pre-estimated parameter is effected by:

performing a Propagator Direct Data Acquisition (PDDA) algorithm using the number of pre-processed samples as input, providing a PDDA pseudo-spectrum comprising a steering matrix, a propagator vector, and an augmented propagator vector, determining a maximum value within the PDDA pseudo-spectrum, determining an angular quantity corresponding to the maximum value, and providing the angular quantity as the pre-estimated parameter, and wherein the operation of calculating the second confidence value for the pre-estimated parameter comprises:

determining a column of a steering vector of the steering matrix, which has been calculated depending on the PDDA algorithm and corresponds best to the pre-estimated parameter, and providing the second confidence value as a function of a norm difference between the determined steering vector and the augmented propagator vector or as a function of a multiplication of the determined steering vector and the augmented propagator vector.

14. The radio receiver device according to claim 9, wherein the operation of performing the final estimation of the parameter using the pre-estimated parameter and therefrom providing the estimated parameter comprises applying a post-processing to the pre-estimated parameter-based on a relationship between the pre-estimated parameter and a number of previously determined estimated parameters, and wherein the operation of calculating the third confidence value for the estimated parameter comprises calculating a standard deviation of the estimated parameter in relation to the number of previously determined estimated parameters and providing the third confidence value depending on the standard deviation.

15. The radio receiver device according to claim 9, wherein the number of signal samples is determined by a reference period defined for the signal received by the anchor point or by the at least one mobile device in the positioning system, wherein the signal conforms to an industry standard and is received in the at least one anchor point by means of at least one antenna array, wherein the reference period is a function of a Continuous Tone Extension as defined in Bluetooth Low Energy.

16. The radio receiver device according to claim 9, wherein the first confidence value represents a measure of a quality of the number of pre-processed samples or number of signal samples, the second confidence value represents a measure of a quality of the pre-estimated parameter, and the third confidence value represents a measure of a quality of the estimated parameter, and wherein the confidence value represents another measure of a quality of the estimated parameter.

17. The radio receiver device according to claim 9, wherein the estimated parameter comprises an angle-of-arrival or an angle-of-departure.

18. At least one tangible, non-transitory, computer readable storage medium storing instructions that, when executed by one or more processors, cause the one or more processors to perform operations comprising:

receiving, by at least one anchor point or by at least one mobile device in a wireless positioning system, a signal comprising a number of signal samples;

in response to receiving the signal comprising the number of signal samples, pre-processing each sample of the number of signal samples and therefrom providing a number of pre-processed samples;

calculating a first confidence value for the number of signal samples or for the number of pre-processed samples;

performing a pre-estimation of a parameter using the number of pre-processed samples and therefrom providing a pre-estimated parameter;

calculating a second confidence value for the pre-estimated parameter, performing a final estimation of the parameter using the pre-estimated parameter and therefrom providing the estimated parameter; and calculating a third confidence value for the estimated parameter, combining at least two of the first confidence value, the second confidence value and the third confidence value and therefrom providing the a confidence value for the estimated parameter;

wherein the confidence value for the estimated parameter is configured to be used in determining a position of the at least one mobile device based on the estimated parameter.

* * * * *